(12) United States Patent (10) Patent No.: US 11,670,098 B2
Mains, Jr. et al. (45) Date of Patent: Jun. 6, 2023

(54) SYSTEMS AND METHODS FOR AUTOMATIC RECOGNITION OF VEHICLE INFORMATION

(71) Applicant: CRC R&D, LLC, Kenner, LA (US)

(72) Inventors: Ronald H. Mains, Jr., Kenner, LA (US); John Guillot, Kenner, LA (US); Matthew Roos, Kenner, LA (US)

(73) Assignee: CRC R&D, LLC, Kenner, LA (US)

( * ) Notice: Subject to any disclaimer, the term of this patent is extended or adjusted under 35 U.S.C. 154(b) by 379 days.

(21) Appl. No.: 16/856,475

(22) Filed: Apr. 23, 2020

(65) Prior Publication Data

US 2020/0342247 A1 Oct. 29, 2020

Related U.S. Application Data

(60) Provisional application No. 62/837,804, filed on Apr. 24, 2019.

(51) Int. Cl.
*G06V 20/62* (2022.01)
*G06K 9/62* (2022.01)
*H04N 7/18* (2006.01)

(52) U.S. Cl.
CPC ........... *G06V 20/62* (2022.01); *G06K 9/6262* (2013.01); *G06K 9/6277* (2013.01); *H04N 7/181* (2013.01); *G06V 20/625* (2022.01)

(58) Field of Classification Search
CPC ...... G06V 20/62; G06V 20/625; G06V 10/82; G06V 30/10; G06K 9/6262; G06K 9/6277; H04N 7/181
See application file for complete search history.

(56) References Cited

U.S. PATENT DOCUMENTS 9,911,084 B2 3/2018 Bryson
10,127,556 B2 11/2018 Lesesky
(Continued)

FOREIGN PATENT DOCUMENTS

CN 109344825 A 2/2019
WO 2006124105 A2 11/2006

OTHER PUBLICATIONS

USPS Yard Management System—VOA Manual WhereNet, Accenture, Apr. 23, 2012 (Year 2012).
(Continued)

*Primary Examiner* — Nam D Pham
(74) *Attorney, Agent, or Firm* — Jason P. Mueller; FisherBroyles, LLP (57) ABSTRACT

Disclosed systems and methods provide automatic recognition of information from stationary and/or moving vehicles. A disclosed system includes an image capture device that captures an image of a vehicle surface and thereby generates image data. A processor circuit receives the image data from the image capture device and may process the image data to determine a Department of Transportation (DOT) number. The processor circuit may control the image capture device to capture a plurality of images, to detect and recognize text characters in each of the plurality of images, and to compare probabilities of likely DOT numbers determined from each of the plurality of images. The processor circuit may be further configured to determine DOT numbers from captured images by processing image data using a machine learning algorithm. The system may be configured to be portable and to perform real-time analysis using an application specific integrated circuit (ASIC).

18 Claims, 8 Drawing Sheets

(56) References Cited

U.S. PATENT DOCUMENTS

| | | | |
|---|---|---|---|
| 10,242,273 | B1 | 3/2019 | Eckman |
| 10,293,842 | B2 | 5/2019 | Miyajima |
| 10,388,162 | B2 | 8/2019 | De Moura |
| 10,706,322 | B1 * | 7/2020 | Yang .................... G06V 30/414 |
| 10,769,947 | B2 | 9/2020 | De Moura |
| 10,990,109 | B2 | 4/2021 | Nelson |
| 2002/0138580 | A1 | 9/2002 | Al-Kazily |
| 2007/0083600 | A1 | 4/2007 | Bakos |
| 2010/0088127 | A1 | 4/2010 | Betancourt |
| 2012/0002045 | A1 * | 1/2012 | Tony .................... H04N 5/2354 |
| | | | 348/143 |
| 2012/0126939 | A1 | 5/2012 | Chang |
| 2014/0074257 | A1 | 3/2014 | Bhargava |
| 2014/0306833 | A1 | 10/2014 | Ricci |
| 2014/0309789 | A1 | 10/2014 | Ricci |
| 2016/0171328 | A1 * | 6/2016 | Bulan .................. G06V 30/268 |
| | | | 382/321 |
| 2016/0171521 | A1 | 6/2016 | Ramirez |
| 2016/0358033 | A1 | 12/2016 | Herrera et al. |
| 2018/0211534 | A1 | 7/2018 | De Moura |
| 2018/0268379 | A1 * | 9/2018 | Collins .............. G06Q 10/1097 |
| 2018/0305876 | A1 * | 10/2018 | Langford ................ G08G 1/042 |
| 2019/0035274 | A1 | 1/2019 | Sabagh |
| 2019/0286143 | A1 | 9/2019 | Ross |

OTHER PUBLICATIONS

C3 Yard datasheet C3 Solutions, Inc., 2016 (Year: 2016).

C3 Solutions Case Study—UK Parcel Delivery Company C3 Solutions, Inc. 2016 (Year: 2016).

The Synchronized Distribution Supply Chain—Best Practices in Yard Management Motorola, 2013 (Year: 2013).

Yard Smart—datasheet C3 Solutions Inc., 2013 (Year: 2013).

4SIGHT helps facilities capitalize on productivity using real-time data Plant Engineering, Jan. 18, 2011 (Year: 2011).

"Big Bend Travel Plaza: Driver Services", published by wwww.bigbendtravelplaza.com on Jan. 8, 2011 (Year: 2011).

"Hotel internet services", published by www.hotelwifi.com, in 2012 (Year: 2012).

Bulan et al., "Segmentation-and Annotation-Free License Plate Recognition with Deep Localization and Failure Identification", IEEE Transaction on Intelligent Transportation Systems, vol. 18, No. 9, Sep. 2017, pp. 2351-2363.

Braun, Gregory, A Practical Guide—Everything you need to know about buying a Dock Appointment Scheduling System C3 Solutions, May 2017 (Year: 2017).

Bulan et al., "Segmentation- and Annotation-Free License Plate Recognition With Deep Localization and Failure Identification", IEEE Transactions on Intelligent Transportation Systems, vol. 18, No. 9, pp. 2351-2363, Sep. 1, 2017 (Sep. 1, 2017).

ITS international "Savings accrue form on-line from truck screening" dated Dec. 8, 2013, all pages (Year: 2013).

Smart Card Alliance, "authentication mechanisms for physical access control", published by Smart Card Alliance on Oct. 2009, all pages. (Year: 2009).

Theodore Kuklinski, "The Use of ID reader-Authentication Secure Access control and credentialing", published by IEEE in 2009, all pages (Year: 2009).

* cited by examiner

| | |
|---|---|
| ← → C | 🔖 https://safer.fmcsa.dot.gov/query.asp ⚞ ✦ 🖉 ← … |

● USDOT Number ○ MC/MX Number ○ Name

Enter Values: 1927736  — 402C

[Search]

Company Snapshot
CROSS ROAD CENTERS TRANSPORTATION LLC
USDOT Number: 1927736

ID/Operations | Inspections/Crashes In US | Inspections/Crashes In Canada | Safety Ratting

Carriers: If you would like to update the following ID/Operations information, please complete and submit from MCS-150 which can obtained online or from your State FMCSA office. If you would like to challenge the accuracy of your company's safety data, you can do so using FMCSA's DataQs system.

Carrier and other users: FMCSA provides the company safety profile (CSP) to motor carriers and the general public interested in obtaining greater detail on a particular motor carrier's safety performance then what is captured in the company snapshot. To obtain a CSP please visit the CSP order page or call (800)832-5660 or (703)280-4001 (Fee Required).

For help on the explanation of individual data fields, click on any field name or for help of a general nature go to SAFER General Help
The information below reflects the content of the FMCSA management information systems as of 12/12/2018.
To find out if this entity has a pending insurance cancellation, please click here.

Other Information for this Carrier
◇ SMS results
◇ Licensing & Insurance

| | | |
|---|---|---|
| Entity Type: | CARRIER | |
| Operating Status: | AUTHORIZED FOR Property | Out of Service Date: None |
| Legal Name: | CROSS ROAD CENTERS TRANSPORTATION LLC | |
| DBA Name: | | |
| Physical Address: | 32 EAST AIRLINE HIGHWAY KENNER, LA 70062 | |
| Phone: | (504) 712-3472 | |
| Mailing Address: | 32 EAST AIRLINE HIGHWAY KENNER, LA 70062 | |
| USDOT Number: | 1927736 | State carrier ID Number: |
| MC/MX/FF Number(s): | MC-689098 | DUNS Number: -- |
| Power Units: | 28 | Drivers: 25 |
| MCS-150 From Date: | 01/03/2017 | MCS-150 Mileage (Year): 2,900,000 (2016) |

Operation Classification:
X Auth. For Hire   Priv. Pass. (Non-business)   State Gov't
  Exempt For Hire   Migrant                    Local Gov't
  Private(property) U.S.Mail                   Indian Nation
  Priv.Pass. (Business) Fed. Gov't Carrier Operation:
X Interstate    Intrastate Only (HM)   Intrastate Only (Non-HM)

Cargo Carried:

602 — Entity Type
604 — Operating Status
606 — Legal Name
608 — Physical Address
610 — Operation Classification
612 — Carrier Operation

700 — ⓘ li-public.fmcsa.dot.gov/reports/rwservlet

702 —
FMCSA Motor Carrier
USDOT Number: 1927736
Docket Name: Mc689098
Legal Name: CROSS ROAD CENTERS TRANSPORTATION LLC
DBA (Doing-Business-As) Name 704 —
Addresses
Business Address: 32 EAST AIRLINE HIGHWAY
KENNER, LA 70062
Business Phone: (504) 712-3472 Business Fax: Fax: (504) 712-3476
Mail Address:

Mail Phone: Mail Fax: Undeliverable Mail: NO

706 —
Authorities:
Common Authority: ACTIVE Application Pending: NO
Contract Authority: NONE Application Pending: NO
Broker Authority: NONE Application Pending: NO
Property: YES Passenger: NO Household Goods: NO
Private NO Enterprise: NO

708 —
Insurance Requirements:
BIPD Exempt: NO BIPD Waiver: NO BIPD Required: $750,000 BIPD on File: $1,000,000
Cargo Exempt: NO Cargo Required: NO Cargo on File: NO
BOC-3: YES Bond Required: NO Bond on File: NO
Blanket Company: TRUCK PROCESS AGENTS OF AMERICA, INC

Comments:

710 —
Active/Pending Insurance:
From: 91X Type: BIPD/Primary Posted Date: 03/07/2018
Policy/Surety Number: TP9882045 04 Coverage From: $0 To: $1,000,000
Effective Date: 03/01/2018 Cancellation Date: 03/01/2019
Insurance Carrier: THE INSURANCE CO OF THE STATE OF PENNSYLVANIA
Attn: AIG GLOBAL CASUALTY-MILTON WEST
Address: 503 CARR RD, 3RD FLOOR
WILMINGTON, DE 19809 US
Telephone: (888) 609 - 7046 Fax: (302) 830 - 4533

Rejected Insurances:
From: Type:
Policy/Surety Number: Coverage From: $0 To: $0
Received: Rejected:
Received Reason:

SYSTEMS AND METHODS FOR AUTOMATIC RECOGNITION OF VEHICLE INFORMATION

This application claims priority to U.S. Provisional Patent Application No. 62/837,804, filed Apr. 24, 2019, the entire contents of which is incorporated herein by reference.

BRIEF DESCRIPTION OF THE DRAWINGS

The accompanying drawings are part of the disclosure and are incorporated into the present specification. The drawings illustrate examples of embodiments of the disclosure and, in conjunction with the description and claims, serve to explain, at least in part, various principles, features, or aspects of the disclosure. Certain embodiments of the disclosure are described more fully below with reference to the accompanying drawings. However, various aspects of the disclosure may be implemented in many different forms and should not be construed as being limited to the implementations set forth herein. Like numbers refer to like, but not necessarily the same or identical, elements throughout.

FIG. 6 illustrates first information from a database that may be associated with recognized vehicle information, according to an embodiment.

DETAILED DESCRIPTION

This disclosure generally relates to systems and methods that provide automatic recognition of information from stationary and/or moving vehicles. Recognized information may include vehicle license plate numbers, a Department of Transportation (DOT) number, cargo information, shipment tracking information, etc. Certain embodiments may read and recognized such information and provide functionality for real-time analysis and processing of the recognized information. For example, a vehicle license plate number and/or a DOT number may be read from a moving vehicle. Information gained in this way may then be processed using information recognition algorithms using, for example, machine learning techniques such as neural network and other artificial intelligence (AI) techniques.

Disclosed embodiments may have industrial applications including: access control and tracking for commercial facilities, real-time insurance and motor carrier authority verification, real-time tracking of motor carriers on public roads, real time issuance of commercial vehicle road violations, etc. Disclosed embodiments may be configured to be deployable as either a fixed or mobile system depending on the needs of a given application. In certain embodiments, sensors and analytical systems may be configured to detect and identify commercial vehicle information at up to highway speeds (e.g., 70 mph). Such systems may be further configured to take actions in response to commands or system configuration instructions provided by a user interacting with a cloud based web console.

Disclosed systems may be deployed in different configurations, each sharing common core components and basic operation principles. An example system includes a minimum of two cameras to capture both a front license plate and a DOT number which may be printed on a side of the vehicle. Other systems may be configured to read both a license plate number and a DOT number using only a single camera.

Figure 1:
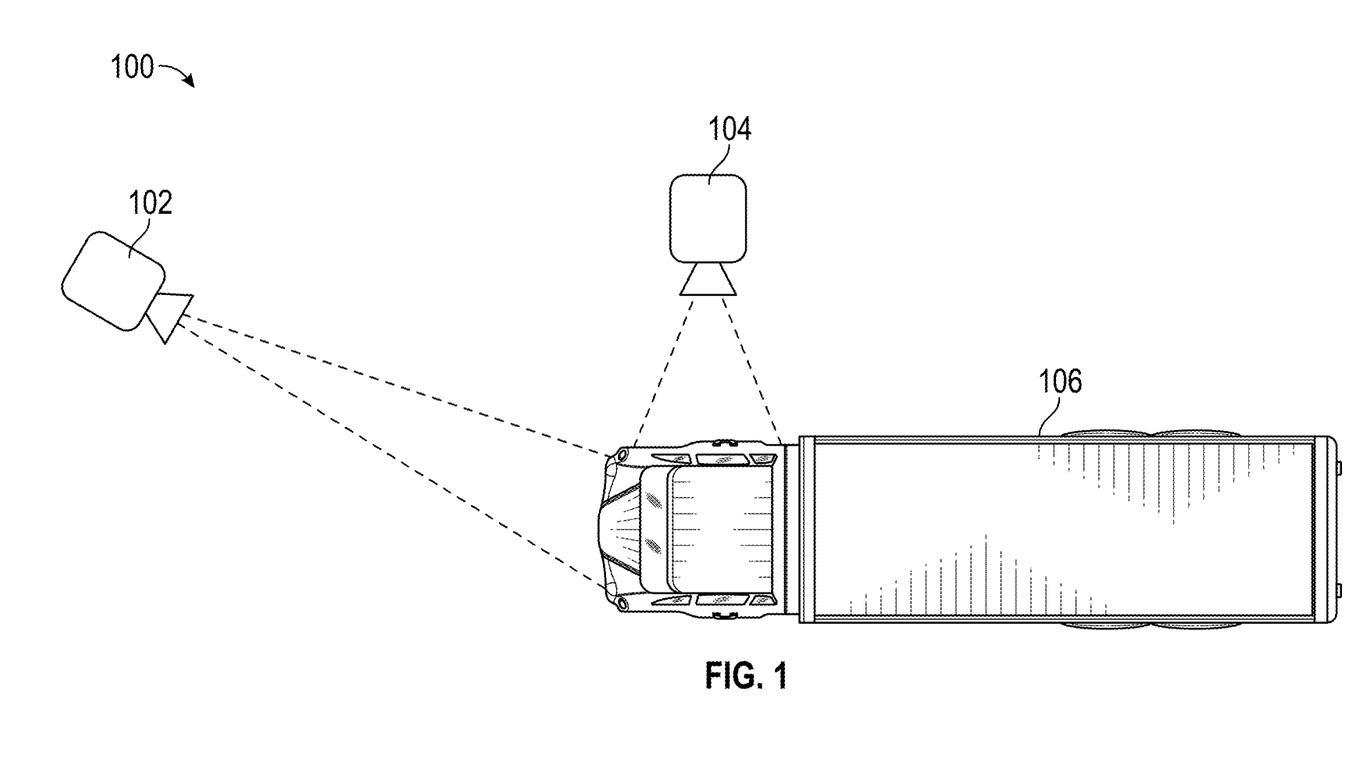
FIG. 1 illustrates a first configuration of cameras of a vehicle information recognition system, according to an embodiment.

FIG. 1 illustrates a first configuration 100 of cameras of a vehicle information recognition system, according to an embodiment. In this configuration, a front camera 102 is configured to read a front license plate and a side camera 104 is configured to read a DOT number of a vehicle 106. In this configuration 100, front camera 102 is positioned ahead of DOT camera 104 so that cameras 102 and 104 are configured to capture images simultaneously or in close succession.

Figure 2:
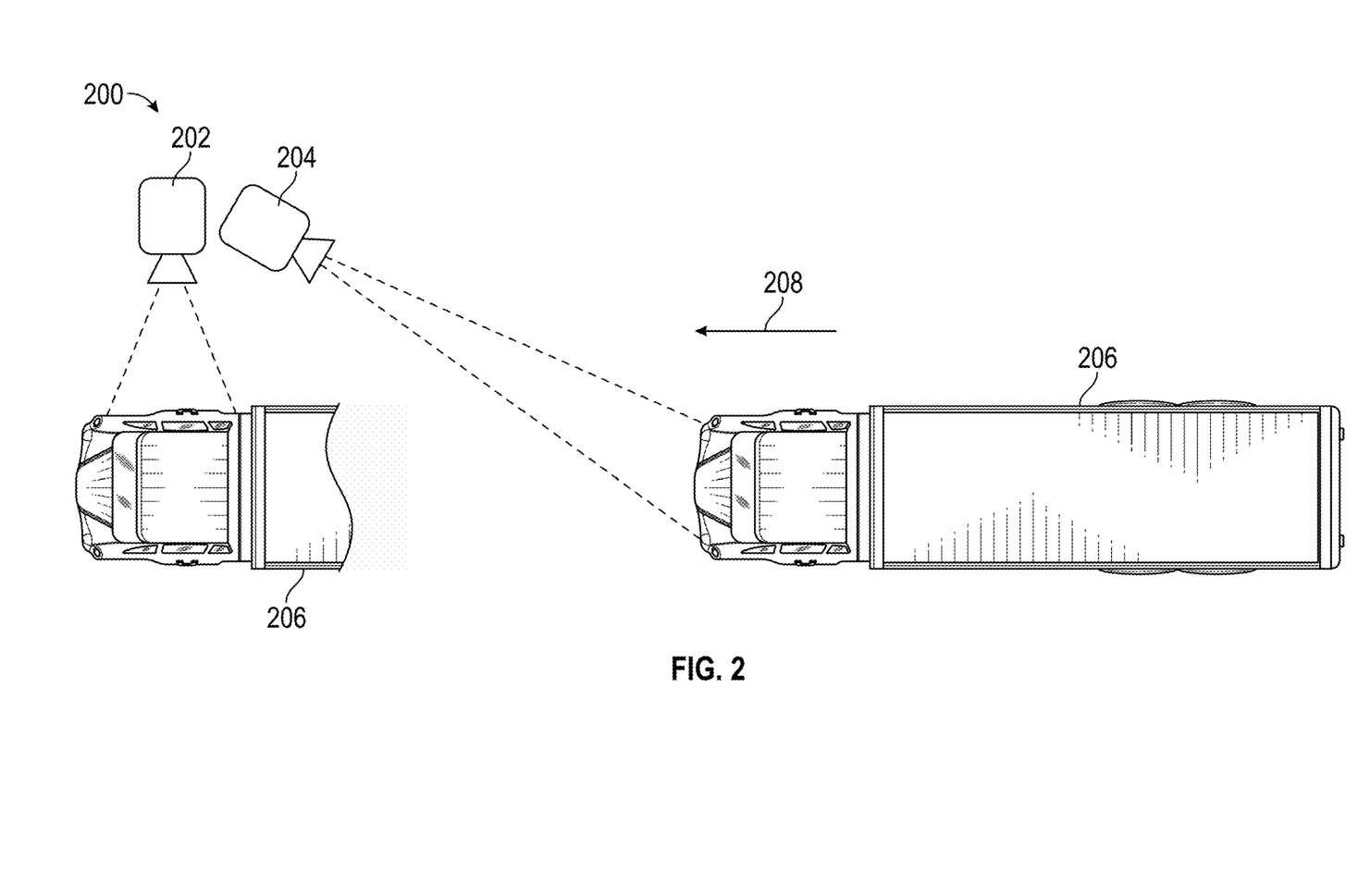
FIG. 2 illustrates a second configuration of cameras of a vehicle information recognition system, according to an embodiment.

FIG. 2 illustrates a second configuration 200 of cameras of a vehicle information recognition system, according to an embodiment. In this configuration, a first camera 202 and a second camera 204 are positioned approximately at a single location. In this configuration 200, images may be captured sequentially as a vehicle 206 passes while moving along a direction of travel 208. In this regard, camera 204 may capture an image of a front license plate when vehicle 206 is approaching. Camera 202 may then capture an image of a side of vehicle 206 as vehicle 206 passes the point where camera 202 is located. In this way, images are captured sequentially.

In further embodiments, systems may be deployed with only a single camera, given sufficient resolution and a sufficiently wide angle of aperture to capture both identification marks. In further embodiments, systems may be scaled for increased accuracy and processing speed by including additional cameras. For example, systems with a plurality of cameras may be used in locations having multiple lanes of traffic. Images captured by a DOT camera (e.g., cameras 104 and 202 of FIGS. 1 and 2, respectively) and by a license plate camera (e.g., cameras 102 and 204 of FIGS. 1 and 2, respectively) may be processed separately and later assembled as a component of a unified record. A license plate number and/or a DOT number may be detected by a machine learning algorithm, as described in greater detail below with reference to FIGS. 3 to 5.

Part of a DOT number detection method includes a verification phase where the detected numbers are compared with a national database of known DOT numbers which may be provided by the Federal Motor Carrier Safety Administration (FMCSA) or by another agency. In this regard, a DOT number is initially identified as being a likely DOT number based on the presence of "DOT", "USDOT", or similar text to the left or above. The FMCSA verification helps confirm the accuracy of the number, in the event that the machine learning algorithm has made a mistake in recognizing one or more digits in the DOT. Verification may further help to eliminate confusion due to other non-DOT numbers which may be present on the side of commercial vehicles (e.g., phone numbers, vehicle fleet numbers, zip codes, etc.).

Further embodiments include determining a relationship between output of a DOT reader and a license plate reader to generate a single record based on the determined relationship. In determining such a relationship, disclosed embodiments use an algorithm that accounts for errors in reading DOT and license numbers, errors resulting from attempts to read information from non-commercial vehicles, errors due to vehicle motion, vehicle stoppage, etc.

Disclosed algorithms employ a scoring system that attempts to detect vehicle height, vehicle color, vehicle motion, and a time between readings taken between license plate cameras and DOT cameras. This information may be used to determine when numbers read by both cameras correspond to information for the same vehicle. If a confidence score is sufficiently high, the two numbers are judged to be a match (i.e., they both correspond to a single vehicle). Such matched records may then be properly associated with a single vehicle in a database or in a report. Accounting for errors is needed, at least in part, because not all vehicles have a DOT number. The detection phase, that includes accounting for errors, may be performed by disclosed systems in less than 10 seconds. Further embodiments may allow processing in shorter times (e.g., less than a second, less than a millisecond, etc.).

Disclosed systems may further include web scraping and business logic methods. A web scraping engine may perform a data extraction process to retrieve relevant fields and screenshots from national databases such as the FMCSA safer website. Such an extraction process may obtain relevant information for a vehicle associated with detected license and DOT numbers. An example of such sites and related information may be found at https://safer.fmcsa.dot.gov/CompanySnapshot.aspx.

Among other capabilities, disclosed systems may recognize and report DOT numbers present on photographic images of vehicles. A temporal sequence of such images (i.e., a "burst" of video frames) may be captured. Algorithmic steps used to recognize a DOT number present in a burst of images are described below, along with methods used to optimize parameters of the algorithm.

A disclosed DOT number recognition algorithm may be based on elements of a multi-language scene text algorithm. A processing pipeline, as summarized in FIGS. 3, 4, and 5, and described in greater detail below, includes at least three stages referred to as the detection, recognition, and decision stages. The first two stages may be executed sequentially on each image and results of such operations may be processed by the final stage, providing a predicted DOT number (if any).

For a burst of images, the various stages include:

Detection Stage: For each image, the detection stage generates a collection of "box coordinates." Box coordinates specify the position of imaginary boxes that enclose sections of text found in the image. A "section" of text typically consists of adjacent text characters without intervening spaces (e.g., a single word or a sequence of digits). Boxes are rotated rectangles, and can be defined by five values (horizontal center, vertical center, width, height, and rotation angle).

Recognition Stage: For each image, all boxes found by the detection stage may be processed by the recognition stage to determine a sequence of text characters found within each box. Characters are reported as those that are most probable ("hard decisions") and also reported as a set of probabilities (e.g., since a '7' can often be mistaken as a '1', a given character might be reported as 90% probability of '7' and 10% probability of '1'). Decision Stage: Content reported by the recognition stage is further processed to find likely locations and identities of DOT numbers, based on the probabilistic location of DOT text ("US DOT", "USDOT", "US-DOT", "DOT" etc.) and strings of numbers appropriately positioned relative to the DOT text (e.g., to the right, or below). Information from all images in a single burst may be combined to further increase a probability of correct identification of a DOT number.

Figure 3:
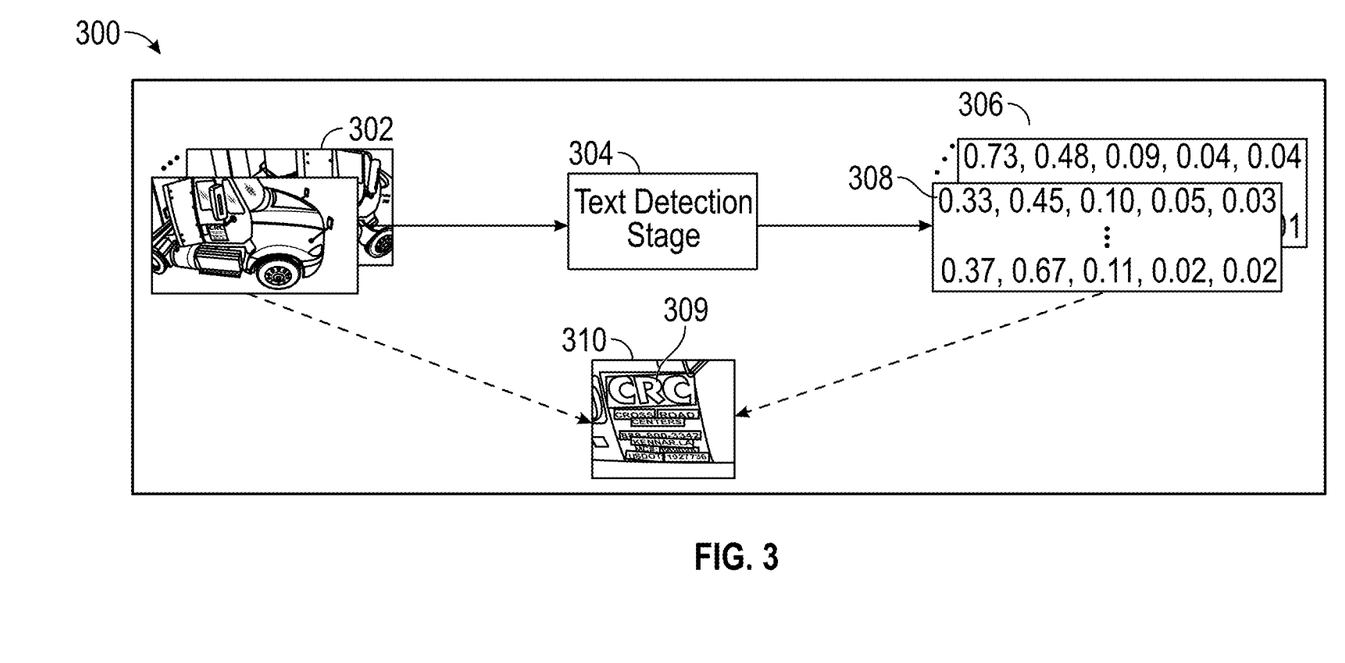
FIG. 3 illustrates an information detection process, according to an embodiment.

FIG. 3 illustrates an information detection process, according to an embodiment. Each image within a burst of captured images 302 may be processed by the text detection algorithm 304. Output for each image is a set of numbers 306 defining a bounding box 308 for a predicted region of text characters. As mentioned above, boxes are defined by five values (horizontal center, vertical center, width, height, rotation angle) where the first four values are normalized by the image width and height (thus ranging from 0.0 to 1.0) and the last value is in radians designating the rotation angle. Box coordinates define imaginary rectangles 309 that surround sections of text in an image 310; although such an image 310 (including rectangles 309) is not actually generated by the detection stage algorithm.

Figure 4:
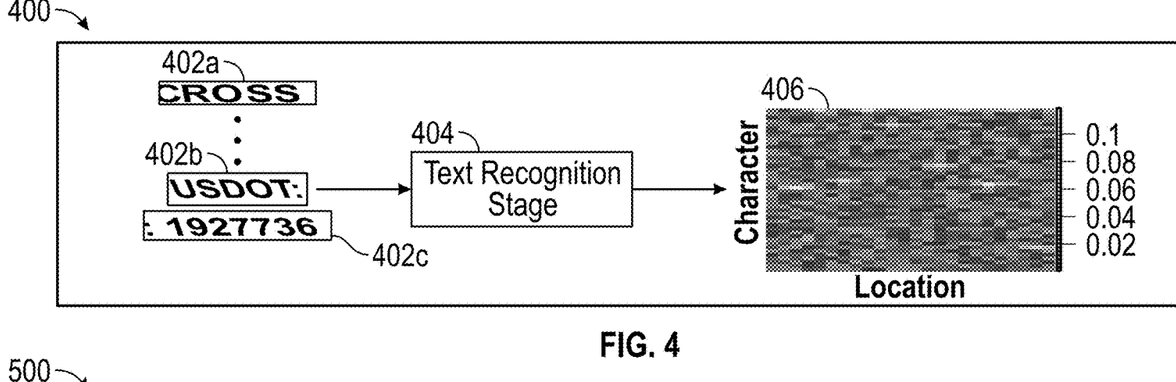
FIG. 4 illustrates an information recognition process, according to an embodiment.

FIG. 4 illustrates an information recognition process 400, according to an embodiment. Coordinates of detected text boxes 402a, 402b, 402c generated in the detection stage are used by a text recognition algorithm 404 to extract image patches (e.g., image 310 of FIG. 3) from the larger images (e.g., images 302 of FIG. 3). Image patches are processed by the recognition algorithm 404 (e.g., a neural network trained with a CTC loss function). Algorithm output for a single image patch is a matrix 406 of character probabilities. Columns of the matrix are probabilities for each possible character (English alphanumeric characters and additional characters such as '#' and '-') for a corresponding vertical slice of the image patch. For the example, for the image patch containing 'USDOT:' 402b, periods of high probabilities for each of the characters can be seen in the output matrix 406 as one scans from left to right. In this example, high character probabilities are interposed by high "blank" probabilities (e.g., see top row of matrix 406) which allow one to discern repeated characters such as '77' in the ': 1927736' image patch 402c from what might otherwise simply be a wide single character.

Figure 5:
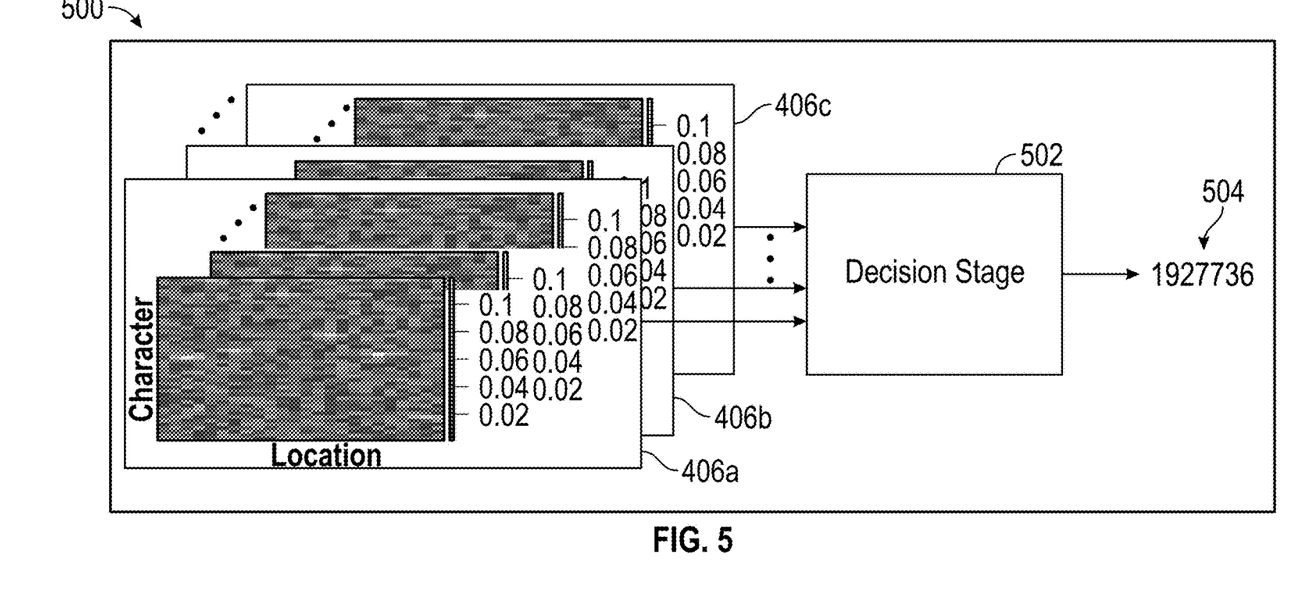
FIG. 5 illustrates a decision process that determines content of recognized information, according to an embodiment.

FIG. 5 illustrates a decision process 500 that determines content of recognized information, according to an embodiment. Probability matrices 406a, 406b, 406c, from each box in each image of a burst, may be used to generate a final decision (e.g., an indication that a specific DOT number has been determined vs. an indication that no DOT number has been determined). This process may be performed first at the single-image level, in which the algorithm searches for boxes that likely contain 'US DOT' text or similar variants. The process may then search for boxes likely containing a string of digits, appropriately positioned relative to the 'US DOT' text. Multiple candidate numbers may be generated for each box, along with confidence (e.g., mean probability) scores. Candidate numbers may then be compared across all images, weighted by confidence scores, to generate a final decision 502. In this example, decision 502 indicates a recognized DOT number 504. If no candidate is above a minimum confidence threshold, a 'no DOT number' decision is made, as described in greater detail below.

Embodiments may include software that implements the "baseline" algorithms of the recognition and detection stages using open source software initially taken from the GitHub repository at https://github.com/MichalBusta/E2E-MLT. The software is written in Python, using the PyTorch module for artificial neural networks with deep learning architectures. Other embodiments may include custom software written in Python or any other suitably chosen programming language.

The detection stage may be implemented as a Region Proposal Network (RPN) developed to target text, as reported in the open literature. In the RPN, the specific architecture is that of the ResNet50 network and was trained by Patel and colleagues using the ICDAR MLT-RRC 2017 dataset. Other embodiments may employ custom built hardware, firmware, and software.

The recognition stage may be implemented as a fully-convolutional network that takes in variable-width images patches extracted from an original image based on detected bounding box coordinates, and resized to a fixed height. Outputs of the convolutional network are sets of probabilities for 7800 different text characters from six languages. A set of such probabilities is generated for every four horizontal pixels of the image patch (i.e., a resized image patch of width W will result in W/4 sets of probabilities). For network architecture and training, Patel and colleagues started with a pre-trained VGG-16 network and conducted fine-tuning using a large data set of annotated scene text (from the six languages) and a Connectionist Temporal Classification (CTC) loss function. Other embodiments may employ other machine learning techniques.

Disclosed embodiments include enhancements/extensions to the baseline algorithms in at least three ways: (1) the recognition algorithm was further enhanced (relative to open source algorithms) by limiting character outputs to those of the English language (and numeric digits), and by fine-tuning the network using a set of annotated images constructed by the inventors, (2) the model was extended with a decision stage that searches for DOT numbers based on the collective outputs of the detection and recognition stages, across all images in a burst, and (3) was implemented for use on low-power mobile platforms. In this regard, the detection and recognition networks were reduced in size and retrained for the specific purpose of detecting and recognizing DOT numbers, with minimal performance loss.

When training machine learning models such as deep neural networks, it is generally necessary to use a training dataset that is specific to the desired function of the model yet spans the range of cases that might be observed during deployed operation. In this case that means training on images of DOT text and numbers with a variety of fonts, colors, sizes, and relative positions, etc. Additionally, vehicles may vary by make, model, color, size/distance, velocity, and lighting conditions.

Using the image acquisition component of the disclosed system, a set of over 15,000 motion-triggered images grouped in bursts of 5-6 images was generated. Various embodiments use a weakly-supervised method to annotate the DOT text and DOT number in about 8,800 of these images. In this regard, candidate recognitions of DOT numbers in a burst were cross-referenced with the U.S. Department of Transportation SAFER system, confirming the presence of the candidate DOT number in at least one of the images in the burst. Cross-referencing allowed erroneous recognitions to be rejected while correct recognitions to be retained. Having identified correct a DOT number for the burst of images with high confidence that the number was indeed correct, the probabilistic recognition outputs for each detected box in the entire burst was compared against the true DOT number. Recognitions that were "close" but incorrect were corrected and the corresponding image was added to the final annotated set. In this manner, erroneous recognitions were corrected and then used to fine-tune neural network parameters in a subsequent round of training. Based on a test set, constructed in this way, improvement of DOT number recognition in single images from 87% to 95% was obtained. Accuracy across a burst of images is higher, as described below.

The decision stage combines information from all boxes and images within a burst to make a final decision. The decision may include determination of a predicted DOT number, or declaring that no DOT number was found. In each individual image, a candidate DOT number is identified by first determining boxes that likely contain some variant of "DOT" (US DOT, USDOT, etc.), excluding those that may include "DOT" but are not part of a target DOT number (e.g., TXDOT). This is done by using probability scores generated by the recognition algorithm to compute the mean character probability for each of the different DOT variants. For example, if the probabilities for the letters U-S-D-O-T in a box with five candidate letters are [0.9, 0.8, 0.6, 0.4, 0.9], then the mean probability for "USDOT" is the mean of those values: 0.72. For any box for which this mean probability ("confidence score") exceeds a fixed threshold (for any of the DOT variants), the boxes immediately to the right and below the identified DOT box are examined for a sequence of 4-8 numbers. For each such DOT-adjacent box, confidence scores are determined for the N most likely sequences of numbers, where N may be set by a user to indirectly negotiate the number of true and false positives. If a score is above a second fixed threshold, the corresponding candidate DOT number is retained for further consideration. Any given image may contain multiple candidates or may contain no candidates.

Candidate DOT numbers from all images in the burst are compared to make a final decision. For all candidates with identical numbers, the single-image scores (described above) are summed to obtain a final score for a unique candidate number. A unique candidate number with a highest final score may then be determined to be the correctly detected DOT number.

In some embodiments, architectures of the baseline (and fine-tuned) networks described above are relatively large, necessitating computational hardware that draws substantial electrical energy during operation. Such systems may thus be difficult or impossible to deploy on modern mobile platforms. Because the baseline networks were originally developed for a larger problem space (recognition of 1000 image classes from the ImageNet Large Scale Visual Recognition Challenge: e.g., see O. Russakovsky et al., "ImageNet Large Scale Visual Recognition Challenge," Int. J. Comput. Vis., vol. 115, no. 3, pp. 211-252, December 2015.), it seemed likely that the size of the networks could be substantially reduced, thereby allowing greater ease of implementation and deployment on mobile platforms.

In this regard, disclosed embodiments were developed that include reduced network sizes for the detection and recognition stages. Network architectures were configured to retain the same number of layers as the original baseline networks but to have layers with reduced sizes. Layer size was reduced through network pruning and retraining of the network. Such pruning and retraining was done in iterations. In each iteration, convolutional layers were pruned by randomly discarding one-half of the channels. Fully-connected layers were pruned by randomly discarding one-half of the neurons (except for the final, output layer). After pruning, the models were retrained starting with the parameter values of the remaining neuron connections, and training on an annotated dataset. Pruning and retraining iterations were repeated until performance fell below that of the baseline network, with statistical significance. In further embodiments, other methods may be employed to prune and retrain networks.

FIG. 6 illustrates first information 600 from a database that may be associated with recognized vehicle information, according to an embodiment. This information may be found at https://safer.fmcsa.dot.gov/CompanySnapshot.aspx. In this example, first information 600 was obtained by entering a DOT number 402c in the form provided at the above-mentioned website. For example, first information 600 was generated for a vehicle having DOT number 1927736 (e.g., see DOT number 402c in FIG. 4). Entering the DOT number causes the website to generate the page of first information 600 shown in FIG. 6. This information includes an entity type 602, an operation status 604 of the vehicle, a legal name 606 associated with the vehicle, a physical address 608 associated with the vehicle, etc. First information 600 includes other relevant information such as an operation classification 610 and carrier operation information 612.

Figure 7:
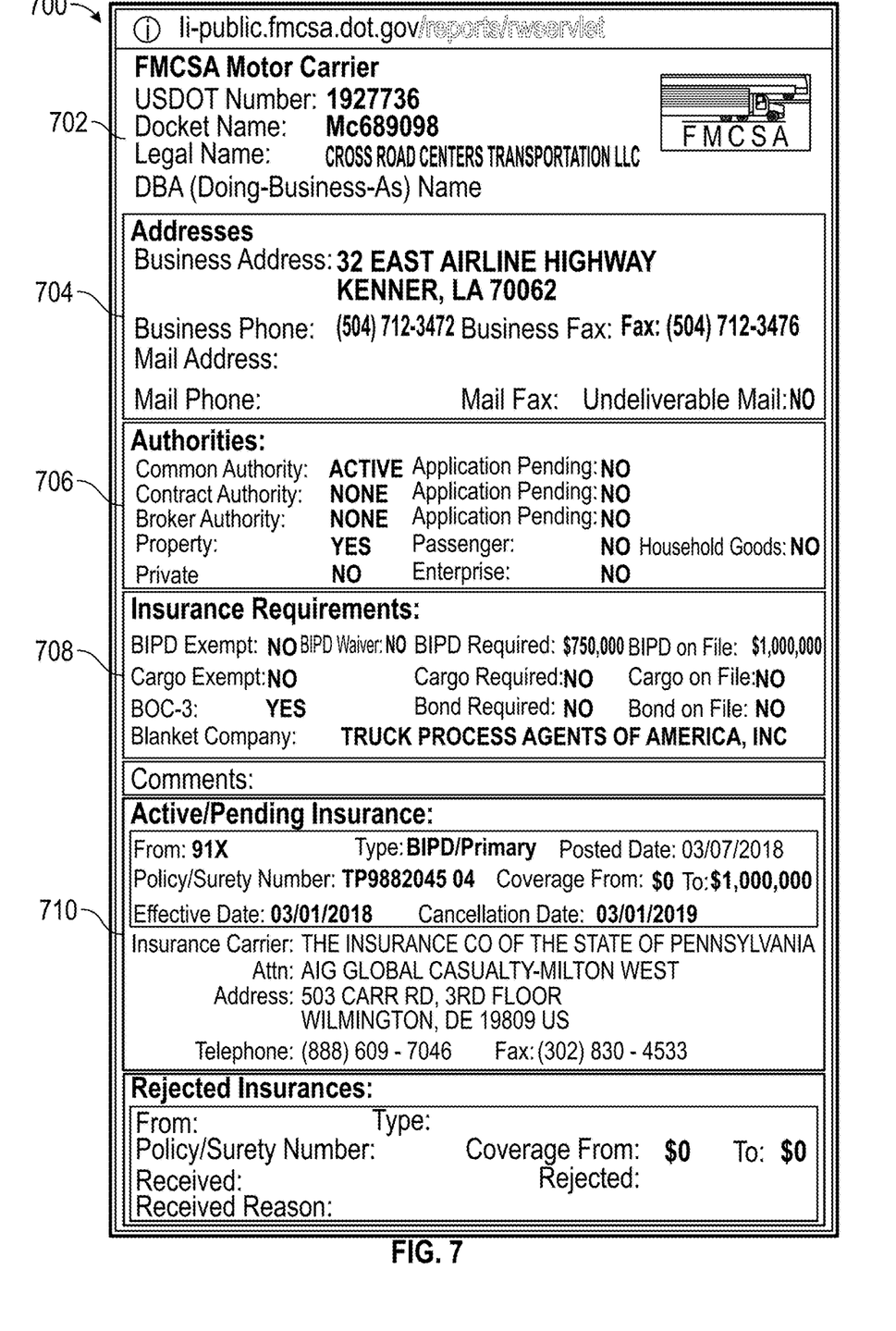
FIG. 7 illustrates second information from a database that may be associated with recognized vehicle information, according to an embodiment.

FIG. 7 illustrates second information 700 from a database that may be associated with recognized vehicle information, according to an embodiment. In this example, second information 700 was also obtained from the FMCSA database (described above) and is presented in a report format. Second information 700 includes a legal name 702 associated with the vehicle, an address 704, authority information 706, information regarding insurance requirements 708, and insurance coverage information 710.

The above described systems may be implemented in a variety of ways. For example, a system may include two high speed IP cameras that are positioned and configured to capture a front license plate and a DOT number. The front license plate camera may be oriented at approximately a thirty-degree angle, relative to a direction of travel, to capture and image of the front of the vehicle. The DOT camera may be oriented at approximately a ninety-degree angle, relative to the direction of travel, to capture an image of a side of the vehicle. Both cameras may be configured to use an on-board motion activation device that is configured to trigger image capture in response to detected motion. Upon activation, cameras may capture a stream, or burst, of images (e.g., images stored in jpeg or other format). Such images may then be immediately transferred to a computing device having a small form factor (e.g., an NVIDIA Jetson embedded system, running Linux).

Image transfer may trigger the neural network to process the images to determine a presence of a DOT number. The resulting data may then be compared in real time with corresponding data in a database (e.g., the FMCSA database) via a parsing script (e.g., written in Python or other programming language). The parsing script may verify authenticity of a recognized number. If no match is found by the comparison, the event and associated images/photos may be logged for future automated or manual sorting, or other use.

The DOT identification stage may be configured to be separate and distinct from the license plate recognition stage. While recognition of both numbers may be occurring on the same hardware platform (e.g., NVIDIA Jetson embedded system) each number may be recognized by using different algorithms. A license plate may be recognized using a first algorithm (e.g., the OpenALPR commercial recognition software) while DOT recognition may be performed using a different algorithm, as described in greater detail above. Both systems may be configured to report their findings to a centralized web server, which may be located close to where images are captured or may be located remotely in a virtualized cloud infrastructure. Reporting may be done, for example, via a secure API socket. Other embodiments may employ other wired or wireless communication channels for reporting.

Since the detection of DOT and license plate numbers may be performed by separate systems, a consistent log may be generated by compiling results from the separate systems. In this regard, license numbers may be associated with DOT numbers. In general, errors may be expected in the process of associating DOT numbers and license plate numbers since one or both systems may fail to identify a vehicle at any given time. To account for such errors, a disclosed algorithm may be configured to apply a weighted score to results of the association process. Such an algorithm may search a series of known data sources (e.g., databases including crash, inspection, and registration data), to determine a relative time of image capture and to verify vehicle color. Such algorithms have been developed and proven to provide a successful association rate of over 98.5% in tests performed by the inventors.

As mentioned above, disclosed embodiments may include a web-based end-user portal and integration system. The user portal may be configured to display recognized images and related information in a user-friendly format so that an end user may view and search vehicles that have been detected. For example, the user portal may be implemented with a Graphical User Interface (GUI). Associated information may include data that was extracted form a database (e.g., data extracted from the FMCSA database) at the time of the scan. The user portal may provide an opportunity for end users to view carriers which meet or fail certain criteria based on the recognized and extracted data.

The user portal may provide functionality for a user to determine various criteria that may be used to generate alerts. For example, a user may wish to be notified when vehicles are detected that are characterized as "out of service." In one embodiment, a user may select an option from a web-based settings menu to designate the desired criterion. Upon setting a criterion for the system to identify all "out of service" vehicles, for example, the system may be configured to then highlight information regarding all detected vehicles that have an "out of service" status. For example, on a user screen such information may be highlighted in red (or other suitable color). Similarly, the system may send notifications, such as an email to a specified email address, a text message to a phone number, etc.

A user may designate various other notification criteria by choosing options from a settings menu. Options may be flexible and may include various criteria to govern data formatting or reporting based on a user's preferences. For example, notifications may be sent based on various triggering events. For example, the system may trigger a gate, may notify personnel, may send an e-mail, a text, or other message (e.g., may send an IFTTT API call) based on user-defined configuration information.

An example system may have hardware components including: two or more fast (e.g., high frames-per-second) IP cameras (e.g., one camera for license plate image capture and one camera for DOT number image capture), an NVIDIA Jetson embedded system, a wired or cellular internet connection for real time reporting, a power supply including one or more of a battery or solar power generation device, and a Linux server or cloud virtual machine (VM) configured to host a web application and to execute software to perform business logic operations.

An example system may have software components including: a neural network (e.g., deployed on the NVIDIA Jetson embedded system) configured to read and identify a DOT number; a license plate reader configured to read and recognize a commercial license plate; and a software application (e.g., written in Python or other programming language) configured to parse output of the neural network and to verify recognized information by comparing the recognized information with counterpart information obtained from the Federal Motor Carrier Safety Administration. Software components may further include a server-side application configured to logically associate recognized license plate and DOT numbers; a web application configured to display results and to generate a report; and a rules-based application programming interface (API) with a web front end configured to receive user information. User information may include commands and configuration instructions that may be used to define custom actions and to integrate vehicle information recognition systems with other systems.

As described above, disclosed systems and methods have at least the following notable features: use of a machine learning deep neural network for the identification of DOT numbers on commercial vehicles; use of specialty low-power AI/machine learning processor hardware for field deployment of vehicle detection hardware with non-grid (solar) power; systems and methods that associate output of DOT and license plate reading systems into a unified record database; and improvement of DOT number detection by use of a weighted scoring technique in comparison with information extracted from public data sources.

Figure 8:
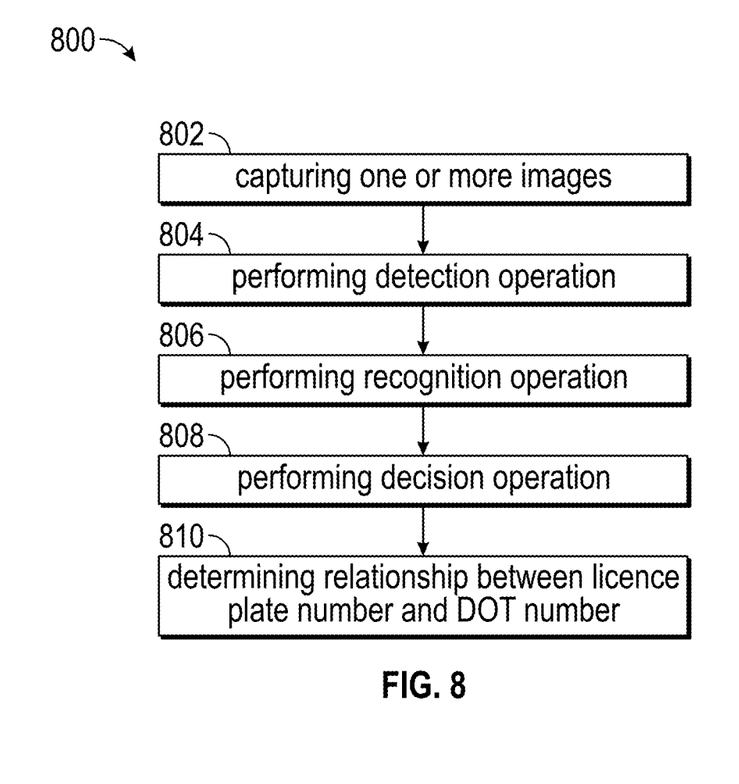
FIG. 8 is a flowchart illustrating a method of recognizing and processing vehicle information, according to an embodiment.

FIG. 8 is a flow chart illustrating a processor-implemented method of recognizing and processing vehicle information, according to an embodiment. In a first stage 802, the method may include using a processor circuit to control an image capture device to capture an image of a vehicle surface to generate image data. Stage 802 may further include using a motion detection sensor to detect vehicle motion and to control the image capture device to capture images based on a signal received from the motion detection sensor. The method may then include processing the image data to determine a DOT number and/or a license plate number.

In this regard, at stage 804, the method may include performing a detection operation to generate box coordinates characterizing boxes that enclose sections of text found in the image data. The determined box coordinates may include numerical values for a horizontal center, a vertical center, a width, a height, and a rotation angle of each box. At stage 806, the method may include performing a recognition operation to determine a sequence of text characters found within one or more boxes defined by the box coordinates. Determining a sequence of text characters may include generating a set of probabilities that characterize uncertainties associated with determined text characters.

At stage 808, the method may include performing a decision operation to identify the DOT number. Identifying the DOT number in stage 808 may include determining probabilistic locations of characters associated with the DOT number. At stage 810, the method may further include determining a relationship between the determined DOT number and a license plate number of the vehicle. Such a relationship may be determined by comparing recognized information with publicly available information from various sources.

In further embodiments, stage 802 may include controlling the image capture device to capture a plurality of images to generate image data based on the plurality of images, and stages 804 to 808 may include detecting and recognizing text characters in each of the plurality of images; and comparing probabilities of likely DOT numbers determined from each of the plurality of images. Image processing may be performed by the processor circuit using machine learning techniques. Further, the processor circuit may be an ASIC that is a component of a portable system.

In further embodiments, stage 802 may include using the image capture device to capture a first image containing a license plate number and a second image containing a DOT number. Stages 804, 806, and 808 may further include determining a license plate number from the first image and determining a DOT number from the second image. Similarly, stage 802 may include using two or more cameras to capture the first and second images.

Figure 9:
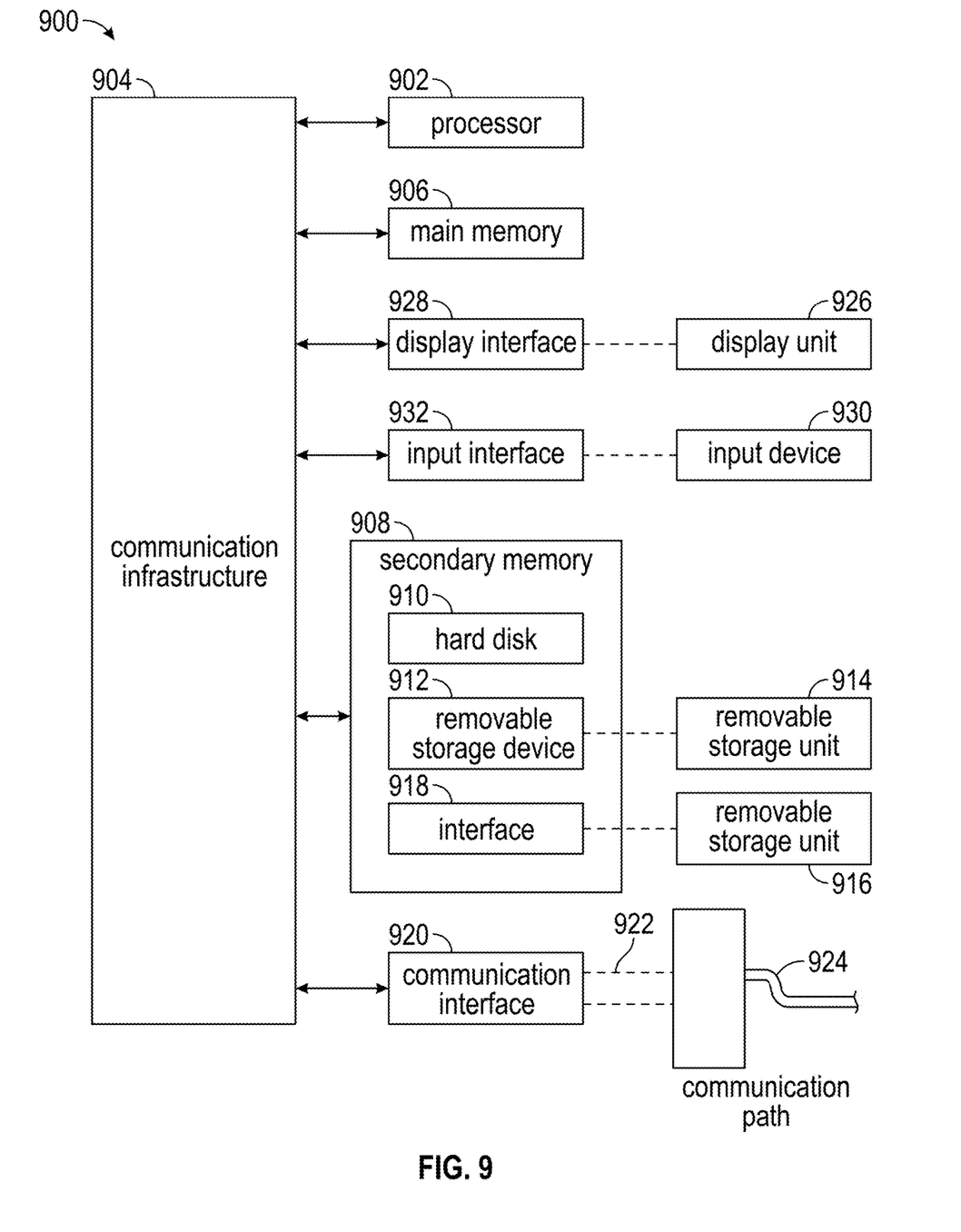
FIG. 9 is a block diagram of an example computer system 900 in which disclosed embodiments of, or portions thereof, may be implemented as computer-readable code, according to an embodiment.

FIG. 9 is a block diagram of an example computer system 900 in which disclosed embodiments of, or portions thereof, may be implemented as computer-readable code (i.e., machine-readable computer program instructions), which is executed by one or more processors causing the one or more processors to perform operations of the disclosed embodiments.

Disclosed systems may include components implemented on computer system 900 using hardware, software, firmware, tangible computer-readable (i.e., machine-readable) media having computer program instructions stored thereon, or a combination thereof, and may be implemented in one or more computer systems or other processing system.

If programmable logic is used, such logic may be executed on a commercially available processing platform or a on a special purpose device. One of ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device.

Various disclosed embodiments are described in terms of this example computer system 900. After reading this description, persons of ordinary skill in the relevant art will know how to implement disclosed embodiments using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

As persons of ordinary skill in the relevant art will understand, a computing device for implementing disclosed embodiments has at least one processor, such as processor 902, wherein the processor may be a single processor, a plurality of processors, a processor in a multi-core/multi-processor system, such system operating alone, or in a cluster of computing devices operating in a cluster or server farm. Processor 902 may be connected to a communication infrastructure 904, for example, a bus, message queue, network, or multi-core message-passing scheme.

Computer system 900 may also include a main memory 906, for example, random access memory (RAM), and may also include a secondary memory 908. Secondary memory 908 may include, for example, a hard disk drive 910, removable storage drive 912. Removable storage drive 912 may include a floppy disk drive, a magnetic tape drive, an optical disk drive, a flash memory, or the like. The removable storage drive 912 may be configured to read and/or write data to a removable storage unit 914 in a well-known manner. Removable storage unit 914 may include a floppy disk, magnetic tape, optical disk, etc., which is read by and written to, by removable storage drive 912. As will be appreciated by persons of ordinary skill in the relevant art, removable storage unit 914 may include a computer readable storage medium having computer software (i.e., computer program instructions) and/or data stored thereon.

In alternative implementations, secondary memory 908 may include other similar devices for allowing computer programs or other instructions to be loaded into computer system 900. Such devices may include, for example, a removable storage unit 916 and an interface 918. Examples of such devices may include a program cartridge and cartridge interface (such as that found in video game devices), a removable memory chip (such as EPROM or PROM) and associated socket, and other removable storage units 916 and interfaces 918 which allow software and data to be transferred from the removable storage unit 916 to computer system 900.

Computer system 900 may also include a communications interface 920. Communications interface 920 allows software and data to be transferred between computer system 900 and external devices. Communications interfaces 920 may include a modem, a network interface (such as an Ethernet card), a communications port, a PCMCIA slot and card, or the like. Software and data transferred via communications interface 920 may be in the form of signals 922, which may be electronic, electromagnetic, optical, or other signals capable of being received by communications interface 920. These signals may be provided to communications interface 920 via a communications path 924.

In this document, the terms "computer program storage medium" and "computer readable storage medium" are used to generally refer to storage media such as removable storage unit 914, removable storage unit 916, and a hard disk installed in hard disk drive 910. Computer program storage medium and computer usable storage medium may also refer to memories, such as main memory 906 and secondary memory 908, which may be semiconductor memories (e.g., DRAMS, etc.). Computer system 900 may further include a display unit 926 that interacts with communication infrastructure 904 via a display interface 928. Computer system 900 may further include a user input device 930 that interacts with communication infrastructure 904 via an input interface 932. A user input device 930 may include a mouse, trackball, touch screen, or the like.

Computer programs (also called computer control logic or computer program instructions) are stored in main memory 906 and/or secondary memory 908. Computer programs may also be received via communications interface 920. Such computer programs, when executed, enable computer system 900 to implement embodiments as discussed herein. In particular, the computer programs, when executed, enable processor 902 to implement the processes of disclosed embodiments, such various stages in disclosed methods, as described in greater detail above. Accordingly, such computer programs represent controllers of the computer system 900. When an embodiment is implemented using software, the software may be stored in a computer program product and loaded into computer system 900 using removable storage drive 912, interface 918, and hard disk drive 910, or communications interface 920. A computer program product may include any suitable non-transitory machine-readable (i.e., computer-readable) storage device having computer program instructions stored thereon.

Embodiments may be implemented using software, hardware, and/or operating system implementations other than those described herein. Any software, hardware, and operating system implementations suitable for performing the functions described herein may be utilized. Embodiments are applicable to both a client and to a server or a combination of both.

The disclosure sets forth example embodiments and, as such, is not intended to limit the scope of embodiments of the disclosure and the appended claims in any way. Embodiments have been described above with the aid of functional building blocks illustrating the implementation of specified functions and relationships thereof. The boundaries of these functional building blocks have been arbitrarily defined herein for the convenience of the description. Alternate boundaries can be defined to the extent that the specified functions and relationships thereof are appropriately performed.

The foregoing description of specific embodiments will so fully reveal the general nature of embodiments of the disclosure that others can, by applying knowledge of those of ordinary skill in the art, readily modify and/or adapt for various applications such specific embodiments, without undue experimentation, without departing from the general concept of embodiments of the disclosure. Therefore, such adaptation and modifications are intended to be within the meaning and range of equivalents of the disclosed embodiments, based on the teaching and guidance presented herein. The phraseology or terminology herein is for the purpose of description and not of limitation, such that the terminology or phraseology of the specification is to be interpreted by persons of ordinary skill in the relevant art in light of the teachings and guidance presented herein.

The breadth and scope of embodiments of the disclosure should not be limited by any of the above-described example embodiments, but should be defined only in accordance with the following claims and their equivalents.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

The specification and annexed drawings disclose examples of various systems, apparatus, devices, and techniques. It is, of course, not possible to describe every conceivable combination of elements and/or methods for purposes of describing the various features of the disclosure, but those of ordinary skill in the art recognize that many further combinations and permutations of the disclosed features are possible. Accordingly, various modifications may be made to the disclosure without departing from the scope or spirit thereof. Further, other embodiments of the disclosure may be apparent from consideration of the specification and annexed drawings, and practice of disclosed embodiments as presented herein. Examples put forward in the specification and annexed drawings should be considered, in all respects, as illustrative and not restrictive or limiting. Although specific terms are employed herein, they are used in a generic and descriptive sense only, and not used for purposes of limitation.

What is claimed is:

1. An information capture and recognition system, comprising:
   an image capture device configured to capture an image of a vehicle surface; and
   a processor circuit configured to perform operations including:
      controlling the image capture device to capture an image of a vehicle surface to thereby generate image data;
      performing a detection operation to generate box coordinates characterizing at least one box that encloses at least one section of text found in the image data, the box coordinates including numerical values for a horizontal center, a vertical center, a width, a height, and a rotation angle; and
      processing the image data within the at least one box to determine a Department of Transportation (DOT) number.

2. The system of claim 1, wherein processing the image data within the at least one box comprises:
   performing a recognition operation to determine a sequence of text characters found within the at least one box; and
   performing a decision operation to identify the DOT number.

3. The system of claim 2, wherein determining a sequence of text characters further comprises generating a set of probabilities that characterize uncertainties associated with determined text characters.

4. The system of claim 2, wherein identifying the DOT number further comprises determining probabilistic locations of characters associated with the DOT number.

5. The system of claim 1, wherein the processor circuit is further configured to perform operations comprising:
   controlling the image capture device to capture a plurality of images to generate image data based on the plurality of images; and
   determining the DOT number by performing operations including:
      performing a detection operation on each of the plurality of images to generate box coordinates characterizing at least one box in each of the plurality of images that encloses at least one section of text found in the image data;
      detecting and recognizing text characters in the at least one box in each of the plurality of images; and
      comparing probabilities of likely DOT numbers determined from each of the plurality of images.

6. The system of claim 1, wherein processing the image data further comprises performing a machine learning algorithm to determine the DOT number based on the image data.

7. The system of claim 6, further comprising an application specific integrated circuit (ASIC) that is configured to perform the machine learning algorithm to determine the DOT number based on the image data.

8. The system of claim 1, further comprising:
   a power source that includes one or more of a battery or a solar power generation device,
   wherein the system is configured to be a portable system.

9. The system of claim 1, further comprising:
   a motion detection sensor that is configured to generate a signal characterizing motion of a vehicle,
   wherein the processor circuit is further configured to perform operations including:
      receiving the signal from the motion detection sensor; and
      controlling the image capture device to capture one or more images based on the received signal.

10. The system of claim 1, wherein the processor circuit is further configured to determine a relationship between the determined DOT number and a license plate number of the vehicle.

11. The system of claim 1, wherein the image capture device is further configured to capture a first image containing a license plate number and a second image containing a DOT number, and
   wherein the processor circuit is further configured to determine a license plate number from the first image and to determine a DOT number from the second image.

12. The system of claim 11, further comprising:
   two or more image capture devices,
   wherein a first image capture device captures the first image containing the license plate number and a second image capture device captures the second image containing the DOT number.

13. A processor-implemented method of capturing and recognizing information, the method comprising:
   controlling, by a processor circuit, an image capture device to capture an image of a vehicle surface to thereby generate image data;
   performing a detection operation to generate box coordinates characterizing at least one box that encloses at least one section of text found in the image data, the box coordinates including numerical values for a horizontal center, a vertical center, a width, a height, and a rotation angle; and
   processing the image data within the at least one box to determine a DOT number.

14. The method of claim 13, wherein processing the image data within the at least one box comprises:
   performing a recognition operation to determine a sequence of text characters found within the at least one box; and
   performing a decision operation to identify the DOT number.

15. The method of claim 13, further comprising:
   controlling, by the processor circuit, the image capture device to capture a plurality of images to generate image data based on the plurality of images; and
   determining the DOT number by performing operations including:
      performing a detection operation on each of the plurality of images to generate box coordinates characterizing at least one box in each of the plurality of images that encloses at least one section of text found in the image data;
      detecting and recognizing text characters in the at least one box in each of the plurality of images; and
      comparing probabilities of likely DOT numbers determined from each of the plurality of images.

16. The method of claim 13, wherein processing the image data further comprises performing a machine learning algorithm to determine the DOT number based on the image data.

17. The method of claim 13, further comprising:
   determining, by the processor circuit, a relationship between the determined DOT number and a license plate number of the vehicle.

18. A non-transitory computer-readable storage medium, having computer program instructions stored thereon that, when executed by a processor circuit, cause the processor circuit to perform operations comprising:
   receiving a signal from a motion detection sensor;
   controlling an image capture device to capture one or more images based on the received signal to thereby generate image data;
   performing a detection operation to generate box coordinates characterizing at least one box that encloses at least one section of text found in the image data, the box coordinates including numerical values for a horizontal center, a vertical center, a width, a height, and a rotation angle; and
   processing the image data within the at least one box to determine a DOT number.

\* \* \* \* \*